US00RE38609E1

(19) United States
(12) Reissued Patent
Chen et al.

(10) Patent Number: US RE38,609 E
(45) Date of Reissued Patent: Oct. 5, 2004

(54) ON-DEMAND PRESENTATION GRAPHICAL USER INTERFACE

(75) Inventors: Eric Chen, Los Gatos, CA (US); Chris Schoeneman, Palo Alto, CA (US)

(73) Assignee: WebEx Communications, Inc., San Jose, CA (US)

(21) Appl. No.: 10/072,832

(22) Filed: Feb. 6, 2002

Related U.S. Patent Documents

Reissue of:
(64) Patent No.: 6,249,281
Issued: Jun. 19, 2001
Appl. No.: 09/515,121
Filed: Feb. 28, 2000

(51) Int. Cl.[7] ..... G09G 5/00
(52) U.S. Cl. ..... 345/730; 345/720; 345/721; 345/732; 345/838
(58) Field of Search ..... 345/716, 717, 345/719, 720, 721, 722, 723, 730, 731, 733, 838

(56) References Cited

U.S. PATENT DOCUMENTS

| | | | | | |
|---|---|---|---|---|---|
| 4,698,682 | A | * | 10/1987 | Astle | 348/586 |
| 4,783,833 | A | * | 11/1988 | Kawabata et al. | 382/107 |
| 5,253,065 | A | * | 10/1993 | Richards et al. | 348/579 |
| 5,261,041 | A | * | 11/1993 | Susman | 345/473 |
| 5,267,034 | A | * | 11/1993 | Miyatake et al. | 348/352 |
| 5,311,577 | A | * | 5/1994 | Madrid et al. | 379/93.12 |
| 5,479,487 | A | * | 12/1995 | Hammond | 379/88.22 |
| 5,526,413 | A | * | 6/1996 | Cheston, III et al. | 379/230 |
| 5,583,980 | A | * | 12/1996 | Anderson | 345/473 |
| 5,592,228 | A | * | 1/1997 | Dachiku et al. | 348/416.1 |
| 5,638,133 | A | * | 6/1997 | Squier et al. | 348/590 |
| 5,751,281 | A | * | 5/1998 | Hoddie et al. | 715/500.1 |
| 5,760,767 | A | * | 6/1998 | Shore et al. | 345/723 |
| 5,764,901 | A | * | 6/1998 | Skarbo et al. | 709/204 |
| 5,767,897 | A | * | 6/1998 | Howell | 348/14.07 |
| 5,781,190 | A | * | 7/1998 | Gorbet et al. | 345/748 |
| 5,812,736 | A | * | 9/1998 | Anderson | 386/96 |
| 5,822,537 | A | * | 10/1998 | Katseff et al. | 709/231 |
| 5,857,189 | A | * | 1/1999 | Riddle | 707/10 |
| 5,933,137 | A | * | 8/1999 | Anderson | 345/720 |
| 6,084,582 | A | * | 7/2000 | Qureshi et al. | 715/500.1 |
| 6,148,304 | A | * | 11/2000 | de Vries et al. | 707/104.1 |
| 6,282,404 | B1 | * | 8/2001 | Linton | 434/350 |
| 6,496,875 | B2 | * | 12/2002 | Cheng et al. | 710/1 |
| 2002/0054083 | A1 | * | 5/2002 | Boreczky et al. | 345/738 |

FOREIGN PATENT DOCUMENTS

EP 847178 A2 * 11/1997

OTHER PUBLICATIONS

International Organization or Standardisation, Coding of Moving Pictures and Audio, ISO/IEC JTC1/SC29/WG11 N1909, Oct. 1997, Rob koenen, 43pp.*

* cited by examiner

*Primary Examiner*—Ba Huynh
(74) *Attorney, Agent, or Firm*—Blakely, Sokoloff, Taylor & Zafman LLP

(57) ABSTRACT

A graphical user interface ("GUI") is described comprising: a video region for displaying a video of a presenter giving a presentation; a primary slide region for displaying slides used by the presenter during the presentation; and a thumbnail region containing thumbnails representing slides in the presentation, the thumbnails selectable by a user via a cursor control device.

20 Claims, 8 Drawing Sheets

ON-DEMAND PRESENTATION GRAPHICAL USER INTERFACE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to the field of graphical user interfaces ("GUIs"). More particularly, the invention relates to an improved GUI for viewing an on-demand presentation.

2. Description of the Related Art

Current presentation software packages such as Microsoft PowerPoint® allow a user to generate a set of slides which the user may then discuss during a live presentation. In addition, some of these programs allow a user to digitally store audio along with the slide presentation, thereby allowing the entire presentation (i.e., slides+audio) to be transmitted across a network.

However, no comprehensive system exists for producing and distributing on-demand presentations over a network. In addition, no system or method currently available allows companies, organizations and/or individuals to distribute and access streaming, high-quality presentations online. Moreover, no presentation service exists wherein users can search a presentation database and download presentations on specified topics (e.g., using a keyword search, a topic directory, or other search mechanism).

Accordingly, what is needed is an on-demand presentation system and method. What is also needed is a comprehensive turnkey solution for producing, hosting, publishing and/or selling presentations online. What is also needed is a system and method for converting live presentations and/or videotaped presentations into on-demand presentation formats which can then be efficiently delivered to users over a network. What is also needed is an improved GUI for viewing on-demand presentations.

SUMMARY OF THE INVENTION

A graphical user interface ("GUI") is described comprising: a video region for displaying a video of a presenter giving a presentation; a primary slide region for displaying slides used by the presenter during the presentation; and a thumbnail region containing thumbnails representing slides in the presentation, the thumbnails selectable by a user via a cursor control device.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of the present invention include various steps, which will be described below. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An Exemplary Network Architecture

Figure 1:
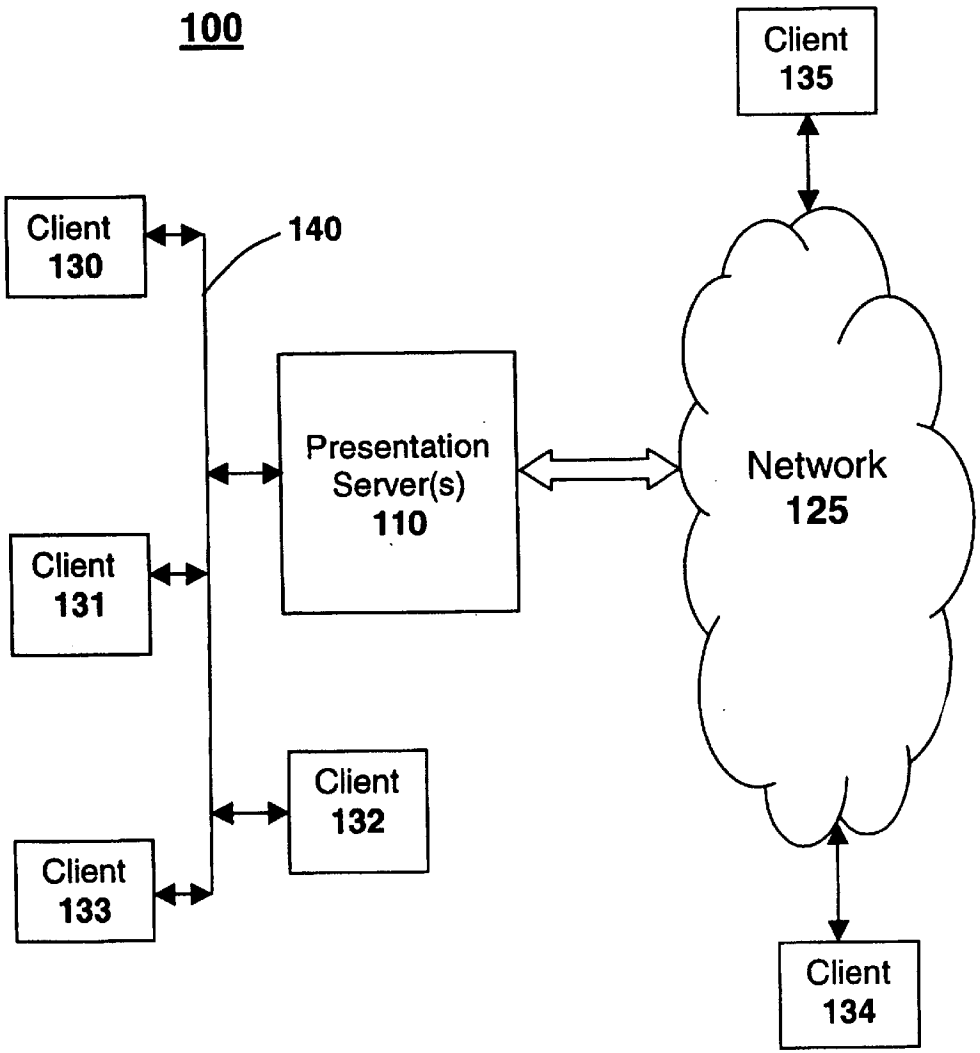
FIG. 1 illustrates an exemplary network architecture which includes elements of the present invention.

Elements of the present invention may be included within a client-server based system 100 such as that illustrated in FIG. 1. According to the embodiment depicted in FIG. 1, one or more presentation server(s) 110 communicate with one or more clients 130–135. The clients 130–135 transmit and receive data from the presentation server(s) 110 over a variety of communication channels including (but not limited to) a local area network 140 and/or a larger network 125 (e.g., the Internet). Alternative communication channels such as wireless communication via satellite broadcast (not shown) are also contemplated within the scope of the present invention.

The presentation server(s) 110 may include a database for storing various types of data. This may include, for example, specific client data (e.g., client account information and client preferences) and various types of on-demand presentations as described herein. The database on presentation server(s) 110 in one embodiment runs an instance of a Relational Database Management System (RDBMS), such as Microsoft™ SQL-Server, Oracle™ or the like.

A user/client 130–135 may interact with and receive feedback from presentation server(s) 110 using various different communication devices and/or protocols. According to one embodiment, a user connects to presentation server(s) 110 via client software. The client software may include a browser application such as Netscape Navigator™ or Microsoft Internet Explorer™ on the user's personal computer which communicates to presentation server(s) 110 via the Hypertext Transfer Protocol (hereinafter "HTTP").

In other embodiments contemplated within the scope of the invention, clients communicate with presentation server(s) 110 via cellular phones and pagers (e.g., in which the necessary transaction software is embedded in a microchip), handheld computing devices, and/or touch-tone telephones. It should be noted, however, that the underlying principles of the invention are not limited to any particular type of communication medium.

An Exemplary Computer Architecture

Figure 2:
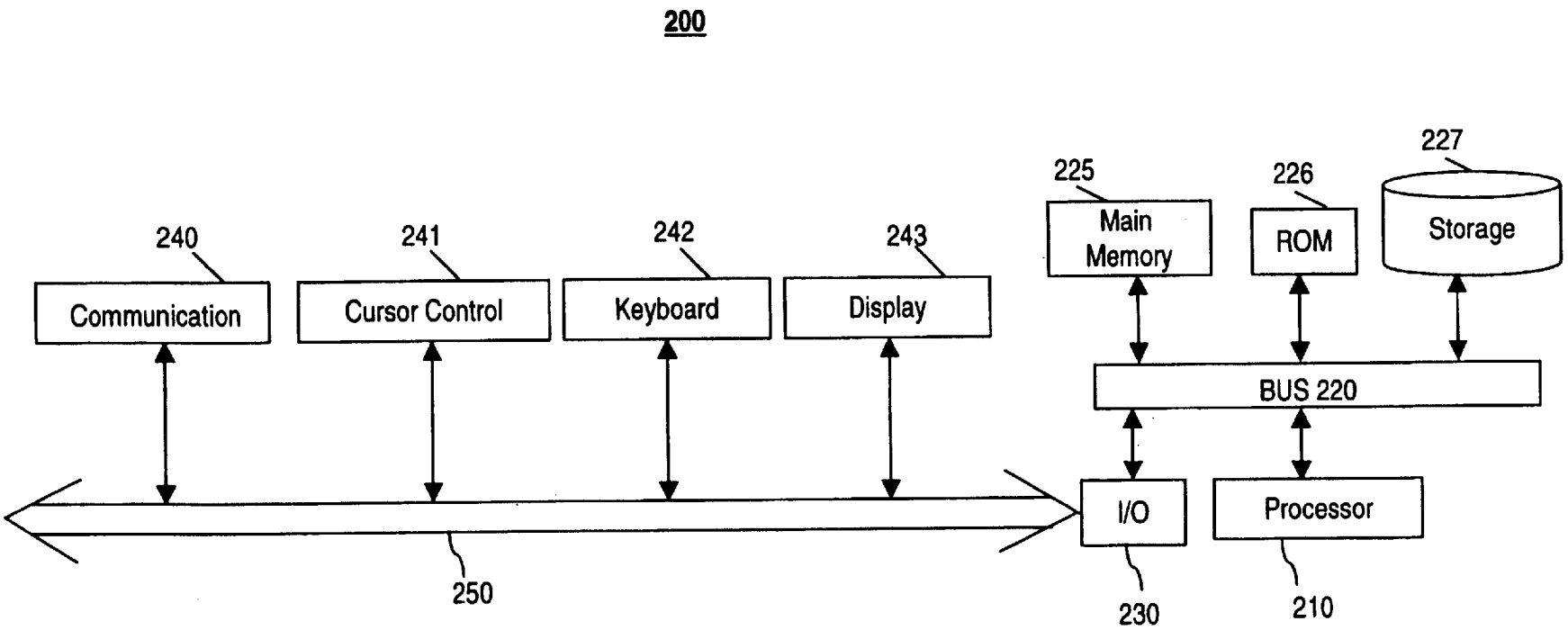
FIG. 2 illustrates an exemplary computer architecture which includes elements of the present invention.

Having briefly described an exemplary network architecture which employs various elements of the present invention, a computer system 200 representing exemplary clients 134, 135 and servers 110 for implementing elements of the present invention will now be described with reference to FIG. 2.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. The computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241).

The communication device 240 is used for accessing other computers (servers or clients) via a network 125. The communication device 240 may comprise a modem, a network interface card, or other well known interface device, such as those used for coupling to Ethernet, token ring, or other types of networks.

EMBODIMENTS OF THE INVENTION

Figure 3:
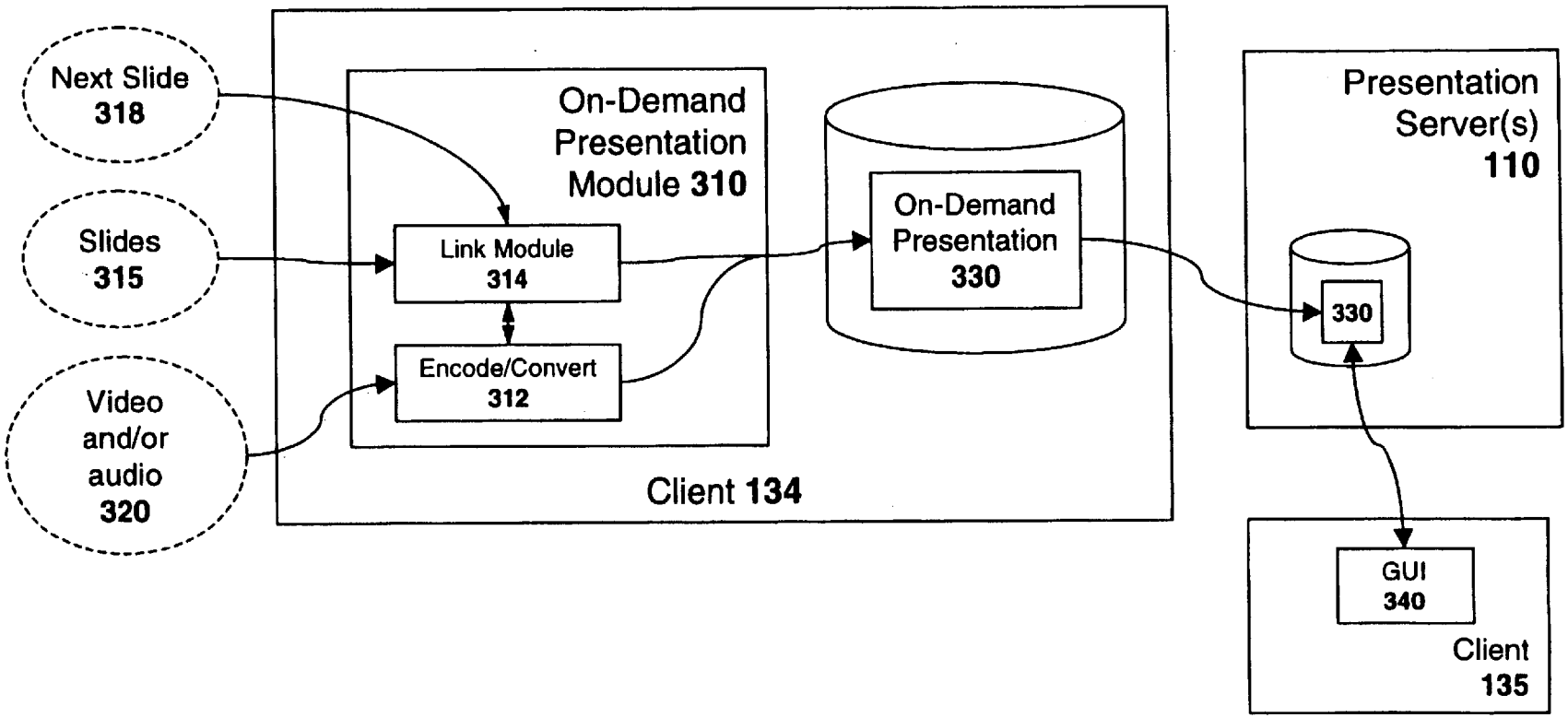
FIG. 3 illustrates one embodiment of a system for generating an on-demand presentation using audio and/or video of a live presentation.

One embodiment of the system and method will now be described with reference to FIG. 3. In this embodiment, an on-demand presentation module 310, executed on a client (e.g., client 134) or a server (not shown), generates an on-demand presentation 330 using a set of presentation slides 315 and associated audio and/or video 320 of a live presentation. In one embodiment, the audio/video 320 is of a user giving a presentation, and the set of slides 315 are those discussed by the user during his/her presentation. The presentation may have been previously recorded using a variety of different recording media including, for example, VHS videotape, 8-mm videotape, film, or Digital Video Disk ("DVD"), to name a few. In one embodiment (described in detail below with respect to FIG. 4) the video/audio 320 is a live presentation, rather that recorded one. It should be noted, however, that the manner in which the audio/video is transmitted to the on-demand presentation module 310 is not pertinent to the underlying principles of the invention.

An encoder/converter module 312 (hereinafter "encoder") encodes/converts (hereinafter "encodes") the incoming audio/video to a specified digital format. For example, in one embodiment, the encoder 312 may encode the audio/video into a standard format such as a Moving Pictures Experts Group format (e.g., MPEG-2, MPEG-4). In one embodiment, a proprietary encoding format is used to encode the audio/video, such as that disclosed in the co-pending United States patent application entitled "Creating Animation From A Video" (Ser. No. 09/096,720), which is assigned to the assignee of the present application. It should be noted, however, that the underlying principles of the invention are not limited to any particular audio/video encoding format.

A linking module 314 links each of the slides 315 to relevant portions of the encoded audio/video presentation. In one embodiment, as portions of the audio/video 320 are read and encoded, a user manually indicates (represented by the "next slide" input 318 in FIG. 3) when the linking module 314 should begin linking audio/video 320 to the next slide in the slide set. In one embodiment, this is accomplished using a simple cursor control device such as a mouse or keyboard.

Figure 5:
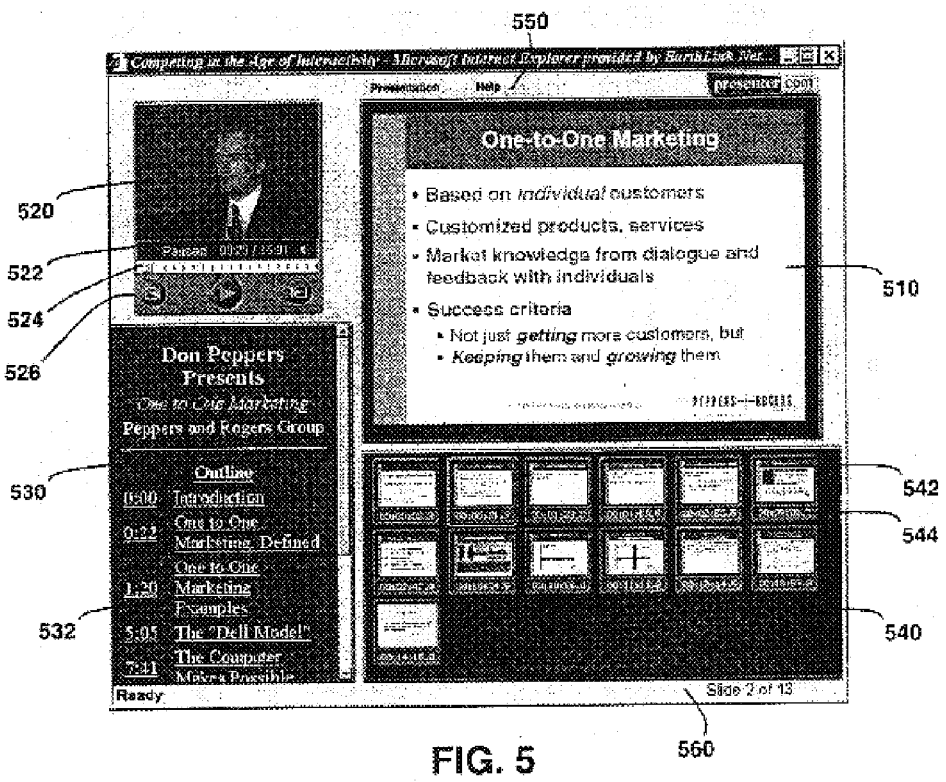
FIG. 5 illustrates one embodiment of a graphical user interface ("GUI") for playing back an on-demand presentation.
Figure 6:
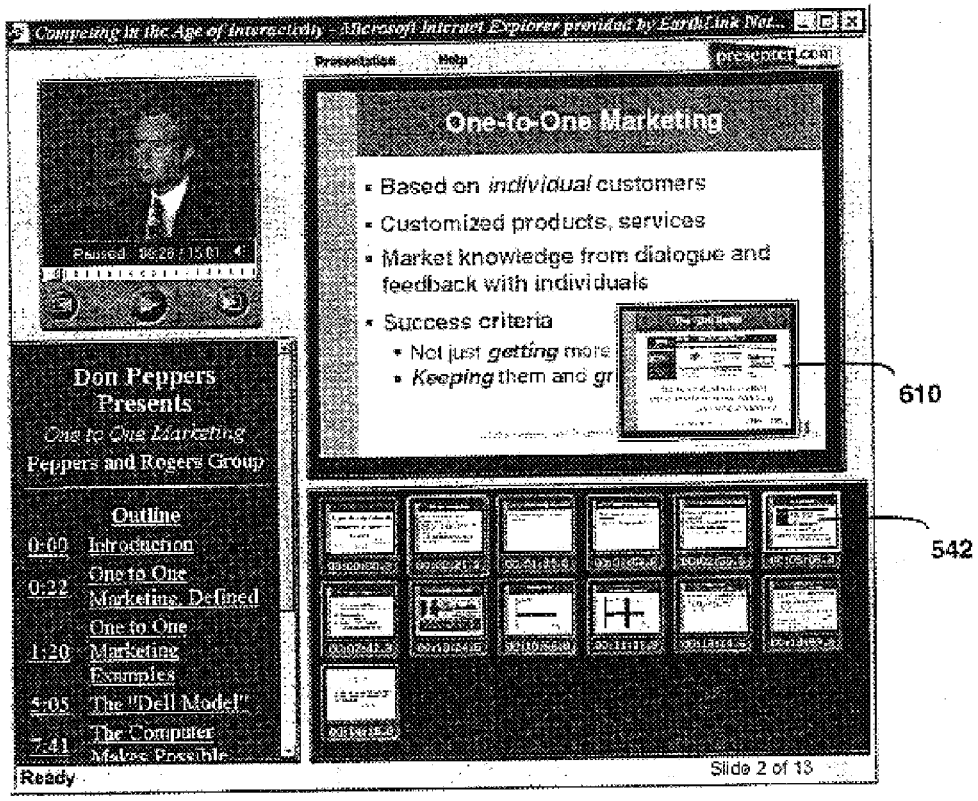
FIG. 6 illustrates additional features of the GUI for playing back on-demand presentations.
Figure 7:
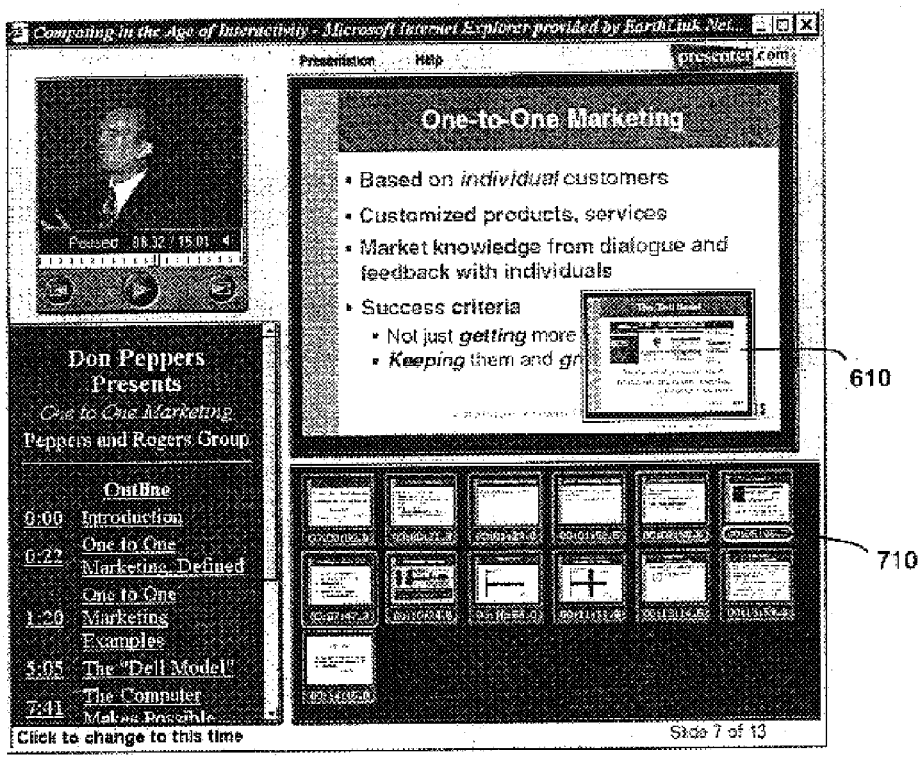
FIG. 7 illustrates additional features of the GUI for playing back on-demand presentations.

Once audio/video 320 has been linked to the last slide in the set, the on-demand presentation 330 is complete. In one embodiment, the set of slides 315, the encoded audio/video 320 and linking data associating each slide to a relevant portion of the audio/video 320 are all embedded in the on-demand presentation 330. The on-demand presentation 330 may then be transmitted to the presentation server(s) 110 and downloaded/streamed to other clients (e.g., client 135) upon request. In one embodiment, a unique graphical user interface ("GUI") executed on the client 135 may be used to play back the on-demand presentation 330. One embodiment of such a GUI is illustrated in FIGS. 5 to 7 and is described in detail below.

In one embodiment, presenters send pre-recorded presentations and slides to an organization maintaining the presentation server(s) 110 (hereinafter the on-demand presentation organization or "ODPO"). The ODPO generates the on-demand presentation 330 as described above on behalf of the presenters (e.g., by coordinating the timing of the slides) and stores the presentation 330 on the presentation server(s) 110, where it may be downloaded/streamed to other users (e.g., client 135).

Figure 4:
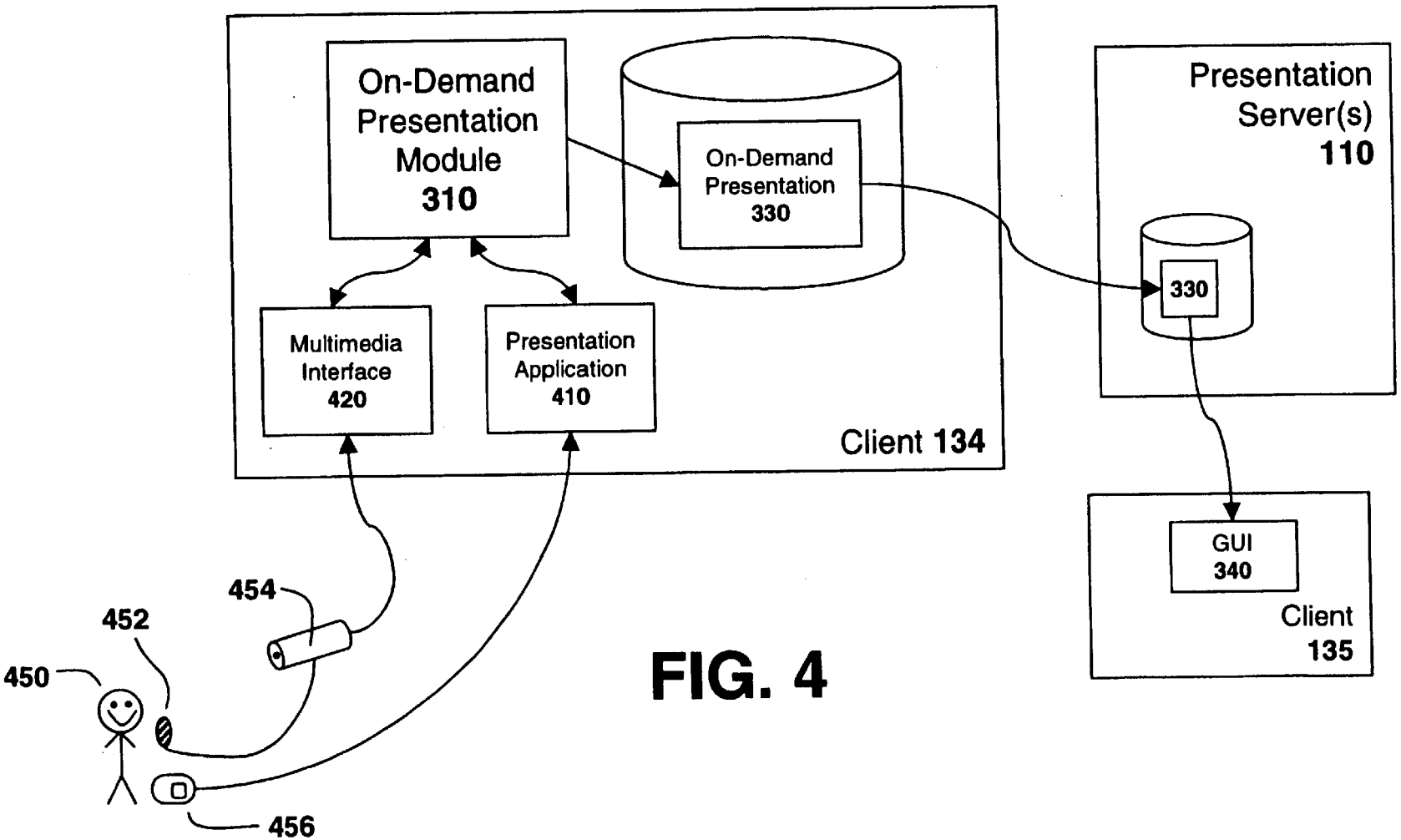
FIG. 4 illustrates one embodiment of a system for generating an on-demand presentation during a live presentation.

According to one embodiment illustrated in FIG. 4, a client 134 (or server) is configured to generate an on-demand presentation 330 in real time (i.e., while user 450 is presenting). As illustrated, the user's 450 image and audio are captured with a video device 454 and/or a microphone 452. The generated audio/video is transmitted to the client 134 via a multimedia interface 420, which may be comprised of hardware, software or any combination thereof. In one embodiment, the multimedia interface 420 is a video card inserted in an accelerated graphics port (AGP) of the client's 134 motherboard.

In one embodiment, a presentation application program 410 such as Microsoft PowerPoint® is executed on the client 134. In another embodiment, a network-based slide creation program is provided for clients who do not own a third-party presentation application such as PowerPoint. This latter embodiment may be provided to the user as a Web-based application transmitted to the client 134 from the presentation server(s) 110.

The user 450 moves from one slide to the next within the presentation application 410 using a mouse 456 or other input device. In one embodiment, the on-demand presentation module 310 links the user's audio/video with the proper slides (e.g., by indicating when the user moves to a new slide during the presentation). When the presentation is complete, the on-demand presentation module 310 stores the recorded audio/video, the slides and the linking data in the on-demand presentation file 330. The slides and associated audio/video may then be transmitted from the presentation server(s) 110 to one or more other clients 135.

In one embodiment, the real-time presentation may be viewed live by a group of participants (e.g., over a network). During the presentation session, one user may be identified as the presenter. When the presenter selects a slide in the presentation (e.g., the next slide in the presentation or the time code corresponding to another slide), the same slide will automatically be selected for all participants involved in the session. In one embodiment, the participants can freely view different slides until the next slide-flipping command is issued by the presenter.

Figure 8:
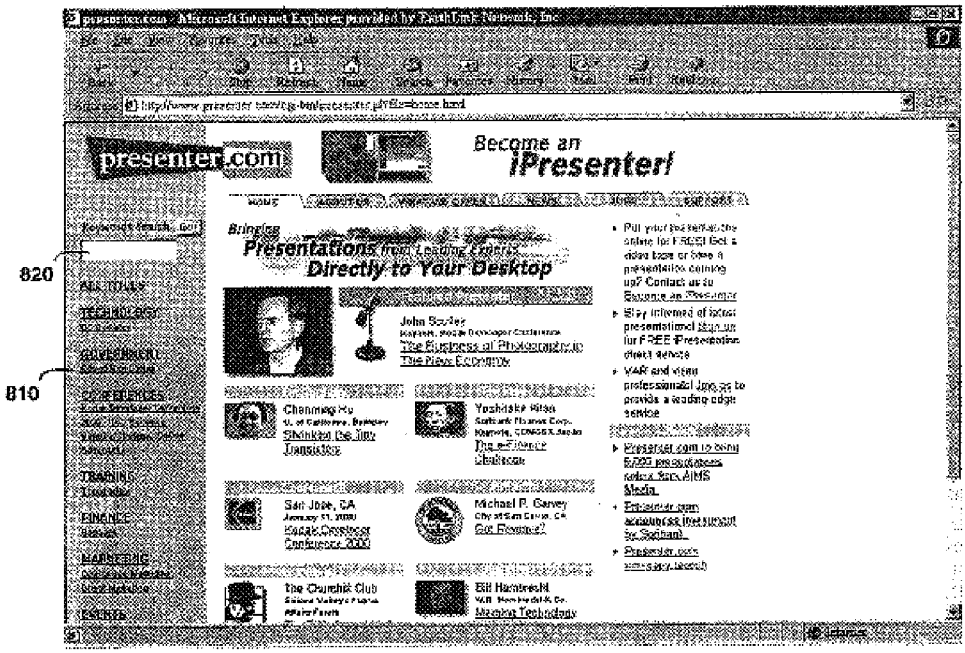
FIG. 8 illustrates search and index features according to one embodiment of the system and method.

In one embodiment, a searchable database of on-demand presentations is maintained on the presentation server(s) 110. As illustrated in FIG. 8, the stored presentations may be categorized in an index 810 (e.g., based on presentation subject-matter), allowing users to manually search for presentations on a particular topic. In addition, a presentation search engine may be included in one embodiment, allowing users to search for a presentation by entering search terms in a keyword search field 820.

One embodiment of a graphical user interface ("GUI") 340 for viewing and navigating within an on-demand presentation is illustrated in FIG. 5. The GUI includes a main menu 550 through which users can access various presentation functions (e.g., user help, as illustrated). In one embodiment, a "review" function (not shown) is included on the main menu 550, allowing users to switch between viewing a presentation and submitting a review of the presentation afterward.

The GUI may also include an audio/video window 520 for viewing and listening to the presenter. The audio/video may be streamed using industry standard streaming techniques (e.g., the RealTime Streaming Protocol) or proprietary streaming techniques. In one embodiment, the on-demand presentation file 330 is stored on portable mass storage medium such as a compact disk or DVD, and no streaming of the audio/video is performed.

In one embodiment, the audio/video window 520 includes a slidebar 524 which, when moved to the left or right, jumps forward or backwards, respectively, in the presentation. A control bar 526 in one embodiment includes back and forward jump buttons, allowing a user to jump back or forward to audio/video associated with the previous/next slide in the presentation. The control bar also includes a play button which, when selected during a presentation, temporarily pauses the presentation.

A primary slide window 510 displays the current slide in the presentation (i.e., the slide which the presenter is currently discussing). In addition, a thumbnail area 540 contains thumbnail representations of each of the slides, typically ordered in a sequential format. Each thumbnail in the illustrated embodiment is comprised of an image portion (e.g., 542) and a time portion (e.g., 544). The time portion 544 of the thumbnail indicates the time at which the slide represented in the image portion 542 was discussed during the presentation. For example, the time portion 544 illustrated in FIG. 5 reads 5:05.3, indicating that the slide represented in the image portion 542 was discussed approximately five minutes and five seconds into the presentation.

In one embodiment, illustrated in FIG. 6, when a user positions a mouse pointer (or other cursor control image) over a thumbnail, the periphery of the thumbnail will become highlighted (as illustrated), and a secondary slide window 610 will appear containing the slide over which the mouse pointer is positioned. In this manner, the user can quickly view a slide without replacing the slide in the primary window 510.

In one embodiment, when the mouse pointer is positioned over a thumbnail and the user selects the thumbnail (e.g., by clicking on a mouse button), the selected slide will appear in the primary slide window 510. Depending on the particular configuration, this may or may not cause the audio/video portion of the presentation to jump to the point at which the selected slide was discussed.

In one embodiment, if the mouse pointer is positioned over the image portion of the thumbnail 542 and selected by the user, the slide associated with the thumbnail will appear in the primary window 510, but the audio/video will not jump to the point at which the selected slide was discussed. However, if the mouse pointer is positioned over the time portion of the thumbnail 544 and selected by the user, the slide associated with the thumbnail will appear in the primary window 510, and the audio/video will jump to the point at which the selected slide was discussed. As illustrated in FIG. 7, in one embodiment, the time portion of the thumbnail 710 will become highlighted when the mouse pointer is positioned above it.

One embodiment of the GUI includes an information window 530 which includes information related to the presentation. For example, this window may include the title of the presentation, the name of the presenter, the presenter's background/qualifications, and/or a list of topics covered in the presentation 532. In one embodiment, the list of topics are hyperlinks which, when selected by a user, will jump to the point in the presentation indicated by the topic. The information window 530 may also include links to Internet sites which contain information related to the subject-matter of the presentation. In addition, one embodiment of the GUI includes a status bar 560 for displaying the current status of the presentation (e.g., which slide is currently being discussed).

In one embodiment, the information window 530 is used to display closed-caption data related to the presentation. In this embodiment, when an on-demand presentation is generated, the closed caption data is synchronized (i.e., linked) with relevant portions of the audio/video (e.g., in a similar manner as each of the slides).

Various types of business methods may be implemented using the on-demand presentation system described herein. For example, in one embodiment, presentation content owners (i.e., the individuals/organizations who own copyrights to the underlying presentations) will pay ODPO to produce and/or host on-demand presentations. In this embodiment, end users (i.e., presentation viewers) may not be charged directly for presentation viewing.

By contrast, in one embodiment, end users (i.e., presentation viewers) will pay for the right to view presentations.

The fee paid by the end users may be split between the content owner and the ODPO based on some predetermined percentage (e.g., 30% to the content owner), and/or based on a flat rate. Users in this embodiment may pay a subscription fee for the right to view any presentations (or any presentations within a particular classification) hosted on the presentation server(s) 110. Alternatively, or in addition, presentations may be sold to end users on a pay-per-view basis, and the pay-per-view fee split between the ODPP and the content owners (e.g., $3.00 for the right to view the presentation for one week).

Whether the fee is paid by presentation viewers or content owners may depend on the type of presentation in question. For example, the ODPO may receive hosting/production fees from content owners for promotional presentations (e.g., advertisements, presentations by individuals directed to prospective employers, . . . etc). In one embodiment, advertisers will pay for presentations to be freely viewed by the public. By contrast, presentations which contain content which is valuable to end users (e.g., a presentation on how to fix a computer, how to install aluminum siding . . . etc) may be sold to end users via pay-per-view or subscription services as set forth above.

In one embodiment, advertisement slides will be embedded within presentations. For example, one advertisement slide may be displayed along with associated audio/video after a certain number of regular presentation slides (e.g., one advertisement after every 5 regular slides). Accordingly, the business model associated with this embodiment resembles to some extent the business model for television advertisements. The advertisements may be embedded directly in the on-demand presentation file. Alternatively, or in addition, the on-demand presentation file may simply contain data which indicates that an advertisement is to be transmitted from a particular source (e.g., an advertisement server). As such, in this embodiment, the particular advertisement transmitted from the source may vary from one playback to the next as different advertisements are rotated into the presentation (i.e., based on the advertisement rotation policy).

In one embodiment, a user viewing the presentation may seek backwards within the presentation freely (i.e., without encountering the advertisement again). If, however, the user seeks forward (i.e., passing the embedded advertisement slide), the advertisement(s) passed by the user will be shown to the user before the presentation slides.

In one embodiment, security measures are implemented to protect the content owners' copyrights to the underlying presentation. For example, when an end user purchases the right to view a particular presentation, identification information may be stored on his computer in the form of a cookie or a token. When the user subsequently makes a request to view the presentation, the presentation server(s) 110 will check to ensure that the token/cookie data is stored on the user's computer before streaming the presentation. In one embodiment, the token may be associated with the user's Internet address to ensure that the user has not simply copied the token from another user's computer.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A graphical user interface ("GUI") comprising:

a video region for displaying a video of a presenter giving a presentation;

a primary slide region for displaying slides used by said presenter during said presentation; and a thumbnail region containing thumbnails representing slides in said presentation, said thumbnails selectable by a user via a cursor control device;

*wherein one or more of said thumbnails is comprised of a first portion and a second portion, wherein selection of said first portion causes a slide associated with said thumbnail to appear in said primary slide region but has no effect on said video, and wherein selection of said second portion causes a slide associated with said thumbnail to appear in said primary slide region and also causes said video to jump to a point in said presentation where a slide associated with said thumbnail was used.*

2. The GUI as in claim 1 wherein, responsive to movement of a cursor above one of said thumbnails, a secondary slide window appears containing an image of a slide associated with said thumbnail.

3. The GUI as in claim 1 wherein selecting a thumbnail from said thumbnail region causes a slide associated with said thumbnail to appear in said primary slide region and causes said video to jump to a point in said presentation where a slide associated with said thumbnail was used.

[4. The GUI as in claim 1 wherein one or more of said thumbnails is comprised of a first portion and a second portion, wherein selection of said first portion causes a slide associated with said thumbnail to appear in said primary slide region but has no effect on said video, and wherein selection of said second portion causes a slide associated with said thumbnail to appear in said primary slide region and also causes said video to jump to a point in said presentation where a slide associated with said thumbnail was used.]

5. The GUI as in claim [4] *1* wherein said first portion is a graphical representation of said slide associated with said thumbnail and said second portion indicates a time at which said slide was used during said presentation.

6. The GUI as in claim 1 wherein said video region includes a slidebar selectable by a cursor for moving backwards and forwards in said presentation.

7. The GUI as in claim 6 wherein said video region further includes "next slide" and "previous slide" buttons for jumping forward and backward in said presentation, respectively.

8. The GUI as in claim 1 further comprising:

an information window containing information related to said presentation.

9. The GUI as in claim 8 wherein said information includes said presenter's name and qualifications.

10. The GUI as in claim 8 wherein said information includes an index of said presentation.

11. The GUI as in claim 1 further comprising a main menu bar through which users can access various presentation functions.

12. The GUI as in claim 11 wherein one of said functions is a review function which, when selected by a user, allows said user to enter a review of said presenter.

13. The GUI as in claim 1 further comprising a status bar for displaying status information on said presentation.

14. A GUI comprising:

*a video window for showing a video of a presentation;* a slide region for displaying one or more slides used in a presentation; and a thumbnail region with thumbnails comprised of:

an image portion containing a graphical representation of said one or more slides, and a time portion containing a time indication of how far into said presentation said slide was shown;

*wherein selection of said image portion of a thumbnail causes a slide associated with said thumbnail to appear in said slide region, but has no effect on said video, and wherein selection of said time portion of a thumbnail causes a slide associated with said thumbnail to appear in said slide region and also causes said video to jump to a point in said presentation where a slide associated with said thumbnail was used.*

15. The GUI as in claim 14 [further comprising a video window for showing a video of said presentation] *wherein responsive to movement of a cursor above one of said thumbnails, a secondary slide window appears containing an image of a slide associated with said thumbnail.*

16. The GUI as in claim 14 [wherein selection of said image portion of a thumbnail causes a slide associated with said thumbnail to appear in said slide region] *further comprising an information window containing information related to said presentation.*

17. The GUI as claimed in claim [15] *14* wherein [selection of said time portion of a thumbnail causes a slide associated with said thumbnail to appear in said slide region and also causes said video to jump to a point in said presentation where a slide associated with said thumbnail was used] *said video region further includes "next slide" and "previous slide" buttons for jumping forward and backward in said presentation, respectively.*

18. An article of manufacture including a sequence of instructions which, when executed by a processor, causes said processor to generate a GUI comprising:

a video region for displaying a video of a presenter giving a presentation;

a primary slide region for displaying slides used by said presenter during said presentation; and a thumbnail region containing thumbnails representing slides in said presentation, said thumbnails selectable by a user via a cursor control device;

*wherein one or more of said thumbnails is comprised of a first portion and a second portion, wherein selection of said first portion causes a slide associated with said thumbnail to appear in said primary slide region but has no effect on said video, and wherein selection of said second portion causes a slide associated with said thumbnail to appear in said primary slide region and also causes said video to jump to a point in said presentation where a slide associated with said thumbnail was used.*

19. The article of manufacture as in claim 18 wherein, responsive to movement of a cursor above one of said thumbnails, a secondary slide window appears containing an image of a slide associated with said thumbnail.

20. The article of manufacture as in claim 18 wherein selecting a thumbnail from said thumbnail region causes a slide associated with said thumbnail to appear in said primary slide region and causes said video to jump to a point in said presentation where a slide associated with said thumbnail was used.

[21. The article of manufacture as in claim 18 wherein one or more of said thumbnails is comprised of a first portion and a second portion, wherein selection of said first portion causes a slide associated with said thumbnail to appear in said primary slide region but has no effect on said video, and wherein selection of said second portion causes a slide associated with said thumbnail to appear in said primary slide region and also causes said video to jump to a point in said presentation where a slide associated with said thumbnail was used.]

22. The article of manufacture as in claim [21] *16* wherein said first portion is a graphical representation of said slide associated with said thumbnail and said second portion indicates a time at which said slide was used during said presentation.

* * * * *